(12) United States Patent
Kung et al.

(10) Patent No.: US 7,792,120 B2
(45) Date of Patent: Sep. 7, 2010

(54) COMPUTER NETWORK PACKET CLASSIFICATION METHOD AND SYSTEM BASED ON A NONOVERLAPPING RULE GROUP ENCODING SCHEME

(75) Inventors: Ching-Fu Kung, Taipei (TW); Sheng-De Wang, Taipei (TW)

(73) Assignee: National Taiwan University, Taipei (TW)

(*) Notice: Subject to any disclaimer, the term of this patent is extended or adjusted under 35 U.S.C. 154(b) by 208 days.

(21) Appl. No.: 12/163,048

(22) Filed: Jun. 27, 2008

(65) Prior Publication Data

US 2009/0196291 A1 Aug. 6, 2009

(30) Foreign Application Priority Data

Jan. 31, 2008 (TW) .............................. 97103642 A

(51) Int. Cl.
*H04L 12/28* (2006.01)
(52) U.S. Cl. ........................... 370/395.32; 370/395.31; 370/389; 370/392; 370/466; 370/474
(58) Field of Classification Search .................. 370/254, 370/351–356, 389, 390, 392, 393, 395.31, 370/395.32, 395.7, 395.71, 395.72, 400, 370/401, 408, 466, 474
See application file for complete search history.

(56) References Cited

U.S. PATENT DOCUMENTS

| | | | | |
|---|---|---|---|---|
| 6,289,013 | B1 * | 9/2001 | Lakshman et al. | 370/389 |
| 6,449,256 | B1 * | 9/2002 | Varghese et al. | 370/238 |
| 6,691,168 | B1 * | 2/2004 | Bal et al. | 709/238 |
| 7,116,663 | B2 * | 10/2006 | Liao | 370/392 |
| 7,313,667 | B1 * | 12/2007 | Pullela et al. | 711/202 |
| 7,408,932 | B2 * | 8/2008 | Kounavis et al. | 370/392 |
| 7,474,657 | B2 * | 1/2009 | Sahni et al. | 370/392 |
| 7,508,825 | B2 * | 3/2009 | Jason, Jr. | 370/389 |

OTHER PUBLICATIONS

T. V. Lakshman, et al. "High Speed Policy-Based Packet Forwarding Using Efficient Multidimensional Range Matching", Sep. 1998, 191-202, ACM SIGCOMM, Vancouver, British Columbia, Canada.
Van Lunteren, J., "Searching Very Large Routing Tables in Fast Sram", Oct. 2002, 4-11, IEEE ICCCN Conf., Scottsdale, Arizona.
Van Lunteren, J., "Searching Very Large Routing Tables in Wide Embedded Memory", Nov. 2001, vol. 3, 1615-1619, IEEE GLOBECOM Conf., San Antonio, Texas.

* cited by examiner

*Primary Examiner*—Pankaj Kumar
*Assistant Examiner*—Mark A Mais
(74) *Attorney, Agent, or Firm*—Pearne & Gordon LLP

(57) ABSTRACT

A computer network packet classification method and system based on a nonoverlapping rule group encoding scheme is proposed, which is designed for integration to a network system for classification of packets within the network system. The proposed method and system is characterized by the use of a nonoverlapping rule group encoding scheme which organizes a database of rules into nonoverlapping rule groups and creates a number of consecutive projected intervals over the dimension of each classification-related field of the packet header, whereby a projected-interval to encoded-bit-vector lookup table and an encoded-bit-vector to rule-group lookup table can be established. During the operation of packet classification, these two lookup tables are used to find the corresponding rule for each incoming packet. This scheme allows the encoded bit vectors to have a reduced bit length, and therefore allows the packet classification to be implemented with low memory requirement and enhanced performance.

22 Claims, 8 Drawing Sheets

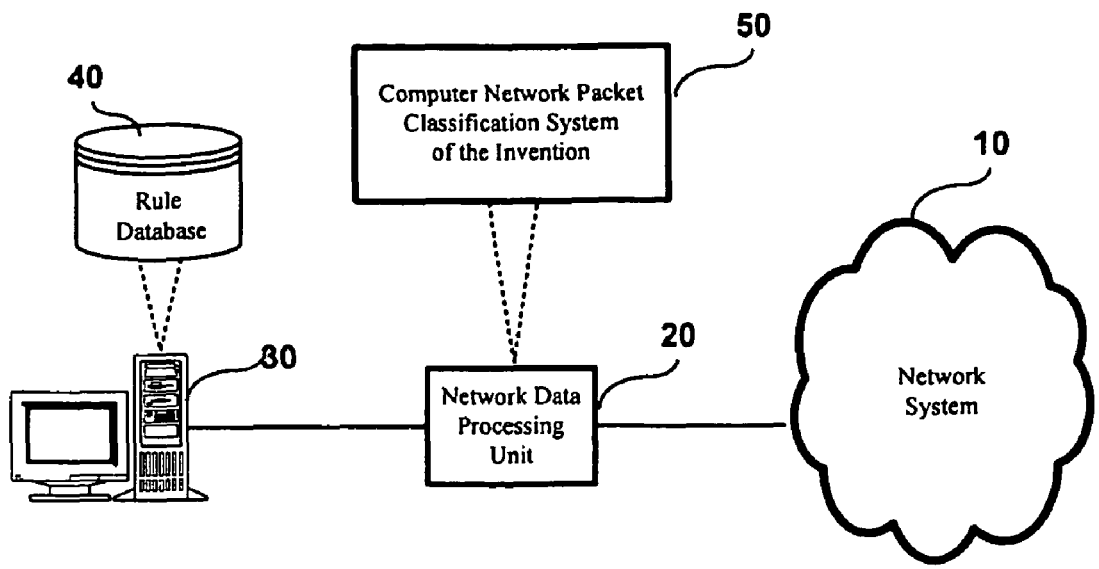
FIG. 1
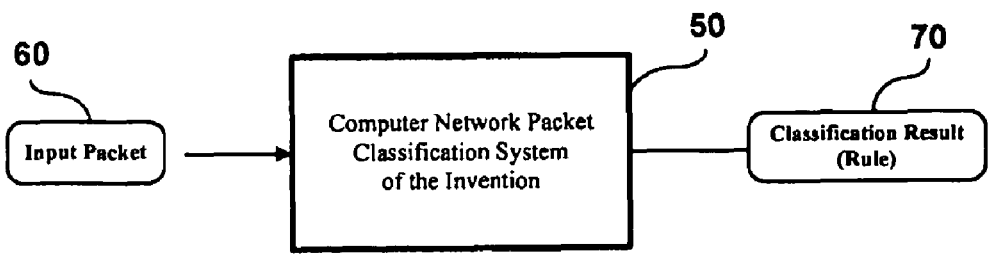
FIG. 2
FIG. 3

| Rule | Field FD1 | Field FD2 |
|---|---|---|
| R(1) | [0:15] | [0:31] |
| R(2) | [64:127] | [16:31] |
| R(3) | [224:255] | [32:63] |
| R(4) | [32:63] | [96:127] |
| R(5) | [128:191] | [0:15] |
| R(6) | [0:95] | [32:63] |
| R(7) | [96:223] | [64:95] |
| R(8) | [192:223] | [96:127] |

41

| PI-EBV Lookup Table for FD1 |||
|---|---|---|
| Projected Interval | Value Range | Primitive Bit Vector (i)th bit from left represents R(i) |
| P1 | [0:15] | 10000100 |
| P2 | [16:31] | 00000100 |
| P3 | [32:63] | 00010100 |
| P4 | [64:95] | 01000100 |
| P5 | [96:127] | 01000010 |
| P6 | [128:191] | 00001010 |
| P7 | [192:223] | 00000011 |
| P8 | [224:255] | 00100000 |

| PI-EBV Lookup Table for FD2 | | |
|---|---|---|
| Projected Interval | Value Range | Primitive Bit Vector (i)th bit from left represents R(i) |
| P1 | [0:15] | 10001000 |
| P2 | [16:31] | 11000000 |
| P3 | [32:63] | 00100100 |
| P4 | [64:95] | 00000010 |
| P5 | [96:127] | 00010001 |

FIG. 7C

COMPUTER NETWORK PACKET CLASSIFICATION METHOD AND SYSTEM BASED ON A NONOVERLAPPING RULE GROUP ENCODING SCHEME

BACKGROUND OF THE INVENTION

1. Field of the Invention

This invention relates to computer network technology, and more particularly, to a computer network packet classification method and system based on a nonoverlapping rule group encoding scheme which is designed for integration to a network system for classification of packets transmitted and received over the network system.

2. Description of Related Art

Packet classification is an important function of network systems for applications such as firewalls and intrusion detection, policy-based routing, and network service differentiations, for use to identify the attributes of all incoming packets based on their headers. When a networking device, such as an enterprise-class server or router, receives an incoming packet, the first step is to determine the type of the packet, such as what protocol is being used by the packet, what ToS (Type of Service) or QoS (Quality of Service) is to be assigned to the packet, the source and destination of the packet (which might be used to indicate, for example, whether the packet is coming from a malignant source), to name just a few.

In actual implementation, packet classification is realized by using a user-predefined rule database which specifies the mapping of predefined field values in the packet header to a set of rules, each rule representing a particular type of action or service that is to be performed on the packet. For example, if the source IP address of an incoming packet is matched to a rule that specifies an unauthorized IP address, the action to be performed on the incoming packet might be to discard the packet or to trace back to its originating source.

Typically, the total number of rules in a rule database might be in the range from several dozens to several thousands. Therefore, the hardware/software implementation of packet classification typically requires a huge amount of memory space for storage of the rule database and also requires a significant amount of access time to search through the rule database for matched rules. This drawback causes the implementation of packet classification to have low system performance.

In view of the aforementioned problem, it has been a research effort in the computer network industry for solutions that can implement the packet classification with reduced memory space and enhanced access speed. Some research results have been disclosed in the following technical papers: [1] *"High speed policy-based packet forwarding using efficient multidimensional range matching"*, authored by T. V. Lakshman et al and published on Proc. ACM SIGCOMM. September 1998, pp. 191-202; [2] *"Searching very large routing tables in fast sram"*, authored by J. van Lunteren and published on Proc. IEEE ICCCN Conf., October 2002, pp. 4-11; and [3] *"Searching very large routing tables in wide embedded memory"*, authored by J. van Lunteren and published on Proc. IEEE GLOBECOM Conf., November 2001. vol. 3, pp. 1615-1619; to name just a few. Among these papers, the first paper [1] teaches the use of a so-called "lucent bit vector" for fast packet classification to find matched rules for the input packets. The second and third papers [2], [3] teach the use of a so-called "elementary interval", or called "projected interval" for implementing fast packet classification. One drawback to these techniques, however, is that it still requires a significant amount of memory space for storage, and therefore still needs an improvement that can be implemented with a reduced memory space.

SUMMARY OF THE INVENTION

It is therefore an objective of this invention to provide a computer network packet classification method and system which can be implemented with reduced memory space and enhanced system performance compared to prior art.

The computer network packet classification method and system according to the invention is designed for integration to a network system, such as the Internet, an intranet system, an extranet system, and a LAN (Local Area Network) system, for classification of packets transmitted and received over the network system.

In architecture, the computer network packet classification system according to the invention comprises: (A) a PI-EBV (projected interval to encoded bit vector) lookup table module; (B) an EBV-FDRG (encoded bit vector to nonoverlapping rule group) lookup table module; (C) a projected-interval determining module; (D) a nonoverlapping rule group searching module; and (E) an intersection operation module.

The computer network packet classification method and system according to the invention is characterized by the use of a nonoverlapping rule group encoding scheme which organizes a database of rules into nonoverlapping rule groups and creates a number of consecutive projected intervals over the dimension of each classification-related field of the packet header, whereby a projected-interval to encoded-bit-vector lookup table and an encoded-bit-vector to rule-group lookup table can be established. During the operation of packet classification, these two lookup tables are used to find the corresponding rule for each incoming packet. This scheme allows the encoded bit vectors to have a reduced bit length, and therefore allows the packet classification to be implemented with low memory requirement and enhanced performance.

BRIEF DESCRIPTION OF DRAWINGS

The invention can be more fully understood by reading the following detailed description of the preferred embodiments, with reference made to the accompanying drawings, wherein:

FIG. 1 is a schematic diagram showing the application of the computer network packet classification system of the invention;

FIG. 2 is a table showing an example of a rule database used for packet classification;

FIG. 3 is a schematic diagram showing the I/O functional model of the computer network packet classification system of the invention;

FIG. 7C shows an example of an FD2-associated PI-EBV lookup table used for packet classification by the invention;

DETAILED DESCRIPTION OF PREFERRED EMBODIMENTS

Figure 4:
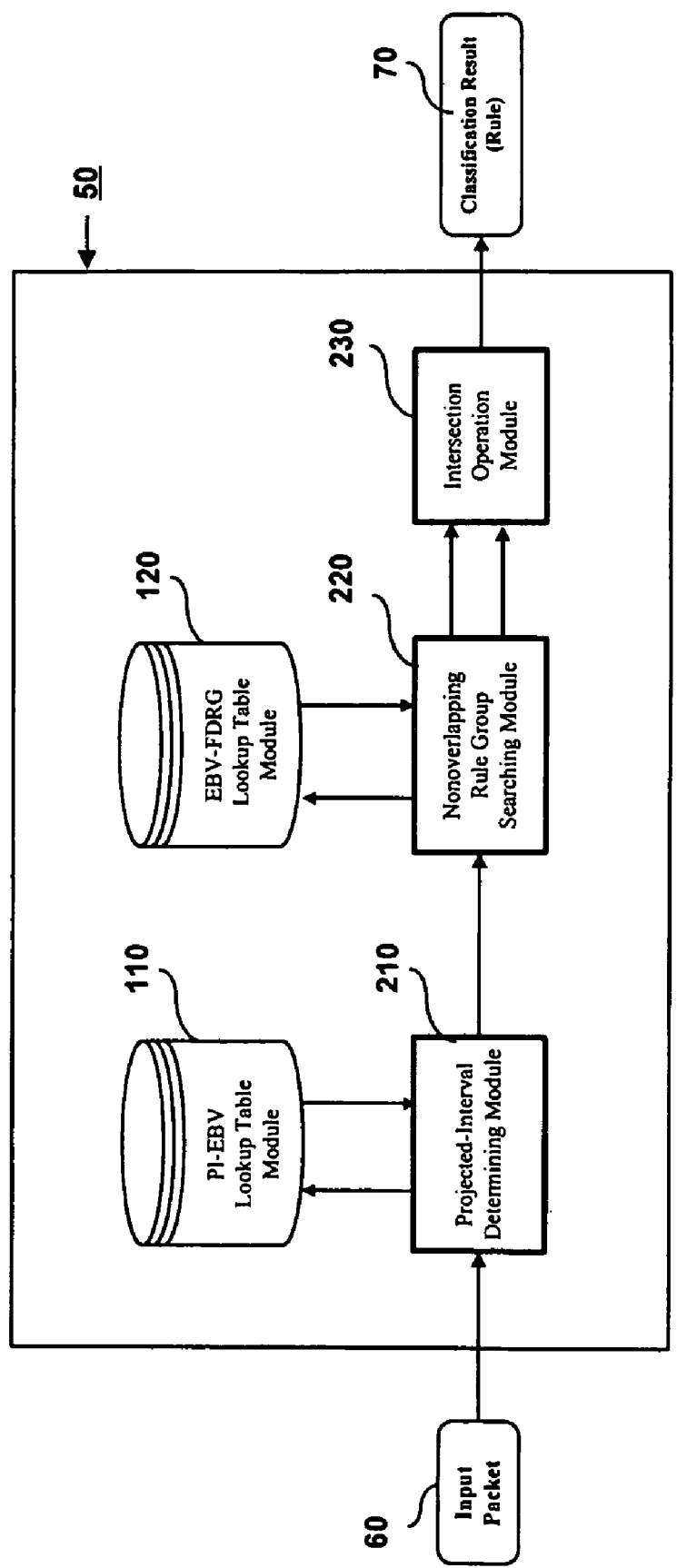
FIG. 4 is a schematic diagram showing the architecture of the computer network packet classification system of the invention.

The computer network packet classification method and system based on a nonoverlapping rule group encoding scheme according to the invention is disclosed in full details by way of preferred embodiments in the following with reference to the accompanying drawings.

Application of the Invention

FIG. 1 is a schematic diagram showing the application of the computer network packet classification system according to the invention (which is here encapsulated in a box indicated by the reference numeral 50). As shown, the computer network packet classification system of the invention 50 is designed for use with a network data processing unit 20, such as a server, a network workstation, a router, or a firewall, that is linked between a computer unit 30 (such as a server or a network workstation) and a network system 10. In practical applications, for example, the network system 10 is a TCP/IP (Transmission Control Protocol/Internet Protocol) compliant network system, such as the Internet, an intranet, an extranet, or a LAN (Local Area Network).

Function of the Invention

In practical applications, the network management personnel needs to first use the computer unit 30 to build a rule database 40 that specifies a set of rules corresponding to particular field values in the header of each input packet 60. FIG. 2 shows an example of the rule database 40 which is devised for the classification of IPv4 (Internet Protocol Version 4) compliant packets based on, for example, 4 header fields: [SOURCE IP ADDRESS], [DESTINATION IP ADDRESS], [SOURCE PORT], and [DESTINATION PORT], whose values are user-predefined to be mapped to one or more rules in a set of N rules {R(0), R(1), R(2), ..., R(N-1)}. However, it is to be noted that the invention is not limited to the application with IPv4-compliant packet classification, and can also be used with IPv6 (Internet Protocol Version 6) compliant packets. Moreover, the number of header fields that are related to packet classification is not limited to 4, and can be 1, 2, 3, 5, or more (i.e., can be any integer number) depending on actual application requirements.

FIG. 3 shows the I/O (input/output) functional model of the computer network packet classification system of the invention 50. As shown, during actual operation of the network data processing unit 20, it will receive one or more network data packets from the network system 10 or the computer unit 30. Each time an input packet 60 is received, the computer network packet classification system of the invention 50 is activated to perform a packet classification process on the input packet 60 by first reading the header of the rule database 40 for the value of each classification-related field, for example the following 4 header fields: [SOURCE IP ADDRESS], [DESTINATION IP ADDRESS], [SOURCE PORT], and [DESTINATION PORT] of the input packet 60. If the values of these header fields are matched to a certain rule in the rule database 40,—such as rule R(i), the computer network packet classification system of the invention 50 will then output rule R(i) as the classification result 70, and activate the network data processing unit 20 to handle the input packet 60 in accordance with a procedure specified by the rule R(i).

Architecture of the Invention

As shown in FIG. 4, in architecture, the computer network packet classification system of the invention 50 comprises: (A) a PI-EBV (projected interval to encoded bit vector) lookup table module 110; (B) an EBV-FDRG (encoded bit vector to nonoverlapping rule group) lookup table module 120; (C) a projected-interval determining module 210; (D) a nonoverlapping rule group searching module 220; and (E) an intersection operation module 230.

Firstly, the respective attributes and behaviors of the constituent components of the computer network packet classification system of the invention 50 are described in details in the following. It is to be noted that, for simplification purpose, the following description of preferred embodiment will be directed to an example of packet classification based on just two packet header fields (FD1, FD2). However, as noted above, the invention is suitable for use with packet classification based on any number of header fields.

PI-EBV Lookup Table Module 110 and EBV-FDRG Lookup Table Module 120

Figure 8:
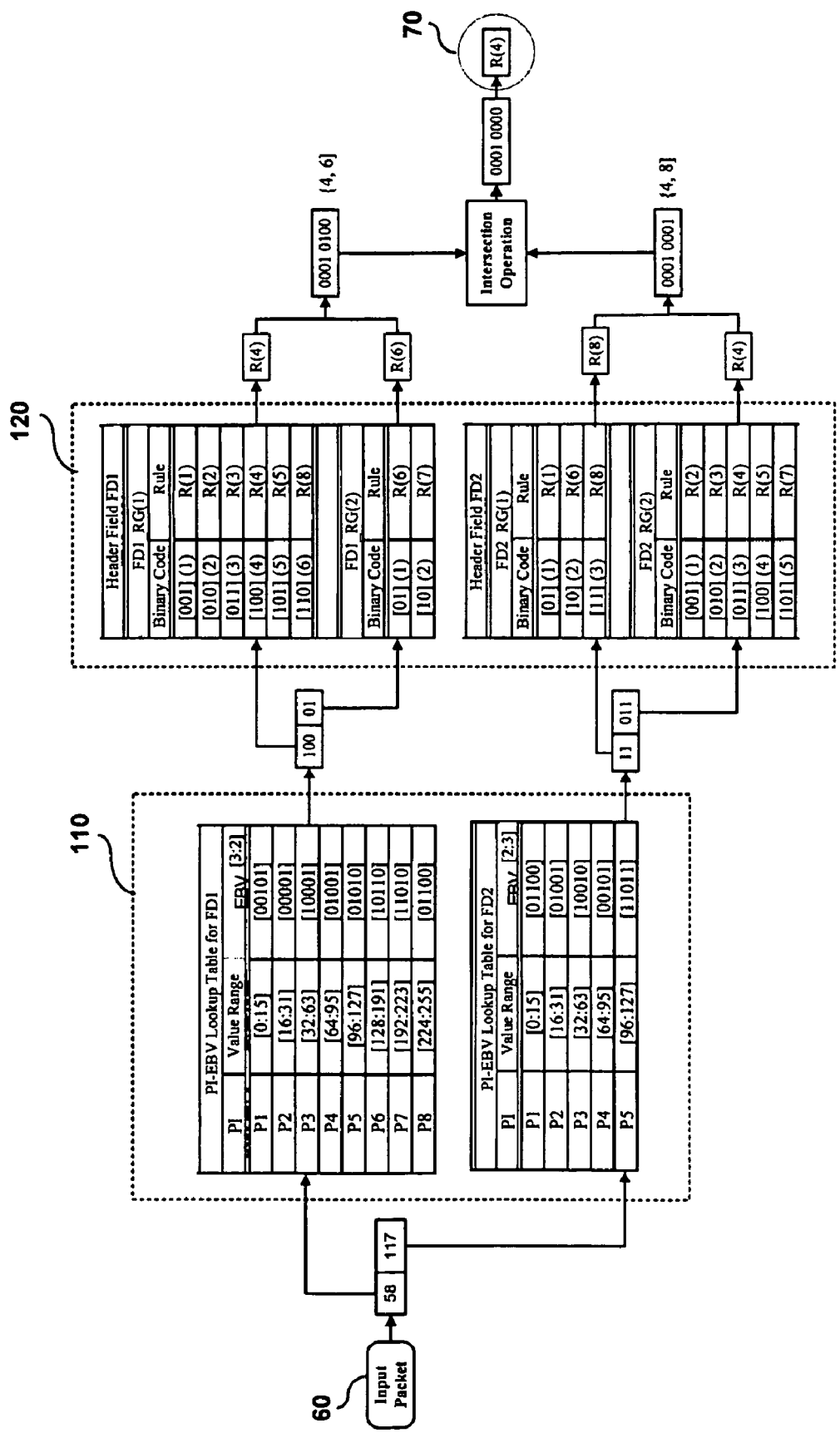
FIG. 8 shows an example of the PI-EBV lookup table module and the EBV-FDRG lookup table module used for packet classification by the invention.

The PI-EBV lookup table module 110 is a lookup table which is predefined to specify the mapping of projected areas (PI) to encoded bit vectors (EBV). FIG. 8 shows an example of the PI-EBV lookup table module 110 based on a rule database 41 shown in FIG. 5. The method for building the PI-EBV lookup table module 110 is described below.

Figures 5, 6A:
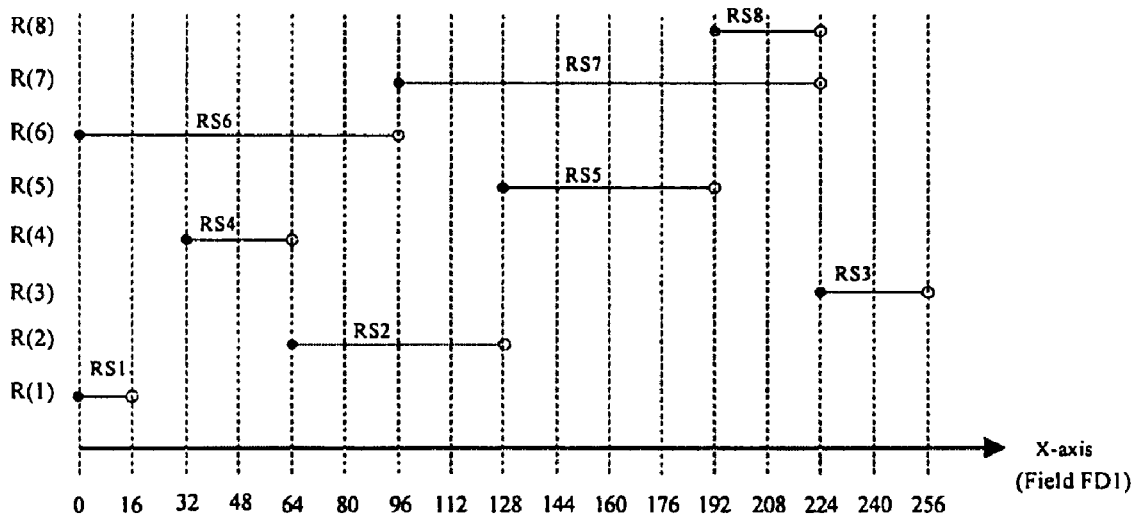
FIG. 5 is a table showing an example of a rule database used for packet classification by the invention.
FIG. 6A is a schematic diagram showing the mapping of all the rules of the rule database shown in FIG. 5 in relation to a first field (FD1) onto a one-dimensional Euclidean space (X-axis)

Referring to FIG. 5, it is assumed that the rule database 41 contains two fields (FD1, FD2) and 8 rules {R(1), R(2), R(3), R(4), R(5) R(6), R(7), R(8)}, wherein the FD1 has a value range 0-255, while the FD2 field has a value range 0-127. In the example of FIG. 5, the first rule R(1) corresponds to an FD1 value range of [0:15] (i.e., the range from 0 to 15) and an FD2 value range of [0:31] (i.e., the range from 0 to 31); the second rule R(2) corresponds to an FD1 value range of [64: 127] and an FD2 value range of [16:31]; and so forth for other rules R(3)-R(8) as shown in FIG. 5.

Next, as illustrated in FIG. 6A, we can regard the FD1 field as a one-dimensional Euclidean space (represented by X axis, for example) and map each of the 8 rules {R(1), R(2), R(3), R(4), R(5) R(6), R(7), R(8)}, i.e., their respective range [0:15], [64:127], [224:255], [32:63], [128:191], [0:95], [96: 223], [192:223], onto this one-dimensional Euclidean space (X-axis). For example, the first rule R(1) whose value range is [0:15] is mapped onto an interval RS1 over the X-axis in the range from 0 to 15; the second rule R(2) whose value range is [64:127] is mapped onto an interval RS2 over the X-axis in the range from 64 to 127; and so forth for the mapping of the other rules R(3)-R(8) to the intervals RS3-RS8. As a result, 8 rule intervals RS1-RS8 are formed by mapping the rules R(1)-R(8) onto the X-axis (one-dimensional Euclidean space).

Figures 6B, 6C:
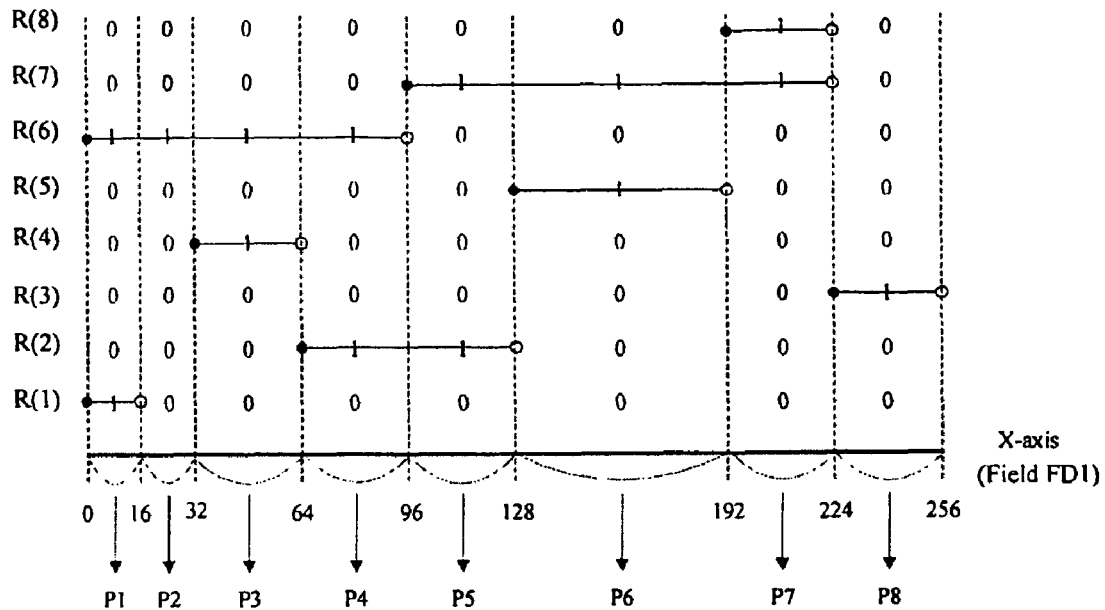
FIG. 6B shows the formation of projected intervals over the one-dimensional Euclidean space (X-axis) shown in FIG. 6A.
FIG. 6C shows an example of an FD1-associated PI-EBV lookup table used for packet classification by the invention.

Next, as illustrated in FIG. 6B, we can project the starting point and ending point of each of the 8 rule intervals RS1-RS8 onto the X-axis, and the projected points are used as delimiting points to delimit the X-axis into a number of projected intervals (PI). In this example, as illustrated in FIG. 6B, a total of 8 projected intervals P1-P8 are defined along the X-axis. Next, we can define that these projected intervals P1-P8 are each associated with a bit vector (hereinafter referred to as "primitive bit vector"), respectively expressed as P(1)_BV, P(2)_BV ..., P(8)_BV, each containing an array of bits equal in number to the rules in the rule database 41. In this example, the rule database 41 contains 8 rules, and therefore each primitive bit vector has a length of 8 bits, each bit corresponding to one of the rules in the rule database 41. As further illustrated in FIG. 6B, since the first projected interval P1 overlaps with RS1 and RS6, the associated primitive bit vector P(1)_BV is coded as [1000 0100], i.e., since RS1 is associated with R(1), the first bit is set to 1, and since RS6 is associated with R(6), the sixth bit is set to 1; and all other bits are set to 0. Similarly, since the second projected interval P2 overlaps with RS6 only, the associated primitive bit vector P(2)_BV is coded as [0000 0100]. The other primitive bit vectors P(3)_BV through P(8)_BV can be coded in a similar manner.

Figure 7A:
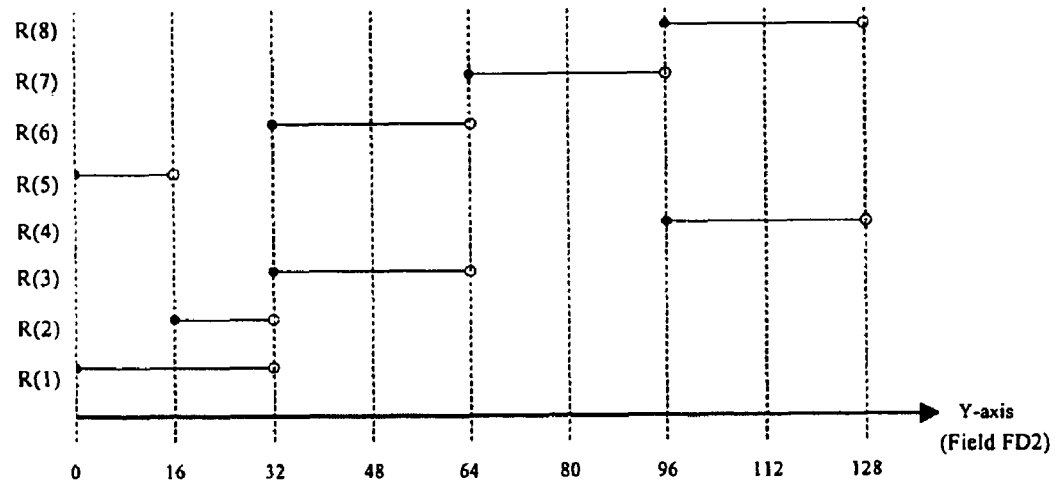
FIG. 7A is a schematic diagram showing the mapping of all the rules of the rule database shown in FIG. 5 in relation to a second field (FD2) onto a one-dimensional Euclidean space (Y-axis)
Figure 7B:
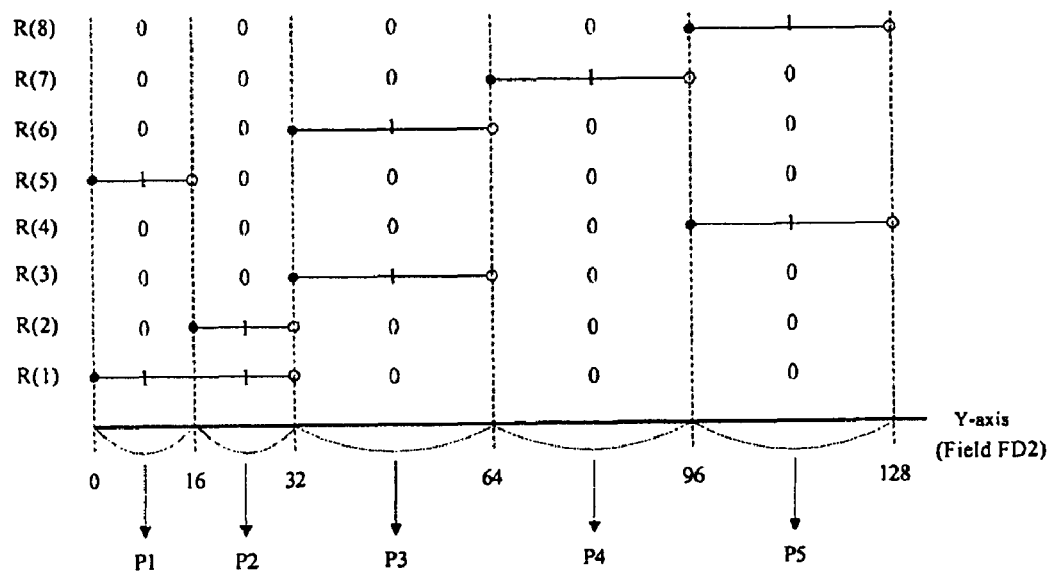
FIG. 7B shows the formation of projected intervals over the one-dimensional Euclidean space (Y-axis) shown in FIG. 7A.

From the above mathematical mapping process, we can establish an FD1-associated PI-EBV lookup table as shown in FIG. 6C. Further, as illustrated in FIGS. 7A-7C, an FD2-associated PI-EBV lookup table can be established through the same mathematical mapping process, which maps the FD2 field values onto another one-dimensional Euclidean space (Y-axis).

In actual implementation, since the primitive bit vectors in the lookup tables of FIG. 6C and FIG. 7C each have a length of 8 bits corresponding to the 8 rules in the rule database 41, it requires the use of an 8-bit memory space for storing each of the primitive bit vectors. For memory saving purpose, the invention utilizes a characterized nonoverlapping rule group encoding scheme that can use a bit vector of 5 bits in length (hereinafter referred to as "encoded bit vector, EBV") to represent the 8 rules in the rule database 41.

The principle and theory of the nonoverlapping rule group encoding scheme is depicted in the following with the FD1 field of the rule database 41 as example. As shown in FIG. 6A, the 8 rules R(1)-R(8) in the rule database 41 are mapped onto the X-axis (one-dimensional Euclidean space) to form 8 rule intervals RS1-RS8, some of which are overlapping with each other, and others are nonoverlapping. For example, RS2 and RS7 are overlapping with each other, while RS1 and RS3 are nonoverlapping. Therefore, based on overlapping or nonoverlapping, we can organize these rule intervals RS1-RS8 into a number of nonoverlapping rule groups, each containing two or more rules whose intervals are nonoverlapping with one another over the X-axis. In this example, as shown in FIG. 6A, it can be seen that the following 6 rule intervals {RS1, RS2, RS3, RS4, RS5, RS8} are nonoverlapping with one another, and therefore can be defined as a first nonoverlapping rule group, represented by FD1_RG(1); and the other 2 rule intervals {RS6, RS7} are also nonoverlapping with one another, and therefore can be defined as a second nonoverlapping rule group, represented by FD1_RG(2).

It should be noted that the above-mentioned nonoverlapping rule group encoding scheme has no restrictions on the total number of rule groups or members in each rule group. For example, the following 6 rule intervals (RS1, RS2, RS3, RS4, RS5, RS8) constitute a nonoverlapping rule group, but we can also organize them into 2 rule groups: {RS1, RS2, RS3} and {RS4, RS5, RS8}. However, the nonoverlapping rule group encoding scheme is preferably implemented in such a manner as to allow the total number of rule groups to be minimum, which can help allow a better system performance in the actual operation of the packet classification.

In accordance with the nonoverlapping rule group encoding scheme, we can organize 2 nonoverlapping rule groups FD1_RG(1) and FD1_RG(2) for the 8 rules in the rule database 41 in relation to the FD1 header field and 2 nonoverlapping rule groups FD2_RG(1) and FD2_RG(2) in relation to the FD2 header field.

The next task is to establish a lookup table (i.e., the EBV-FDRG lookup table module 120) that maps the encoded bit vectors to the rule groups. In this example, the resulted EBV-FDRG lookup table module 120 is shown in FIG. 8. In the establishment of the EBV-FDRG lookup table module 120, the first step is to assign a series of code numbers to the rules in each nonoverlapping rule group, preferably continuous integer numbers starting from 1, and then convert each code number into binary form. For example, the first rule group FD1_RG(1) associated with the FD1 header field contains 6 rules {R(1), R(2), R(3), R(4), R(5), R(8)}; and therefore, these 6 rules are sequentially assigned to a series of integer numbers starting from 1, namely R(1)→1, R(2)→2, R(3)→3, R(4)→4, R(5)→5, R(8)→6; and then the integer numbers are converted into binary form, namely R(1)→[001], R(2)→[010], R(3)→[011], R(4)→[100], R(5)→[101], R(8)→[110]. These mapping relations are then reversed, i.e., [001]→R(1), [010]→R(2), [011]→R(3), [100]→R(4), [110]→R(5), [110]→R(8), and then stored in the EBV-FDRG lookup table module 120, as shown in FIG. 8.

Similarly, the second rule group FD1_RG(2) belonging to the FD1 header field contains 2 rules {R(6), R(7)}; and therefore, these 2 rules are sequentially coded to a series of integer numbers starting from 1, namely R(6)→1, R(7)→2; and then the integer numbers are converted into binary form, namely R(6)→[01], R(7)→[10]. These mapping relations are then reversed, i.e., [01]→R(6), [10]→R(7), and then stored in the EBV-FDRG lookup table module 120, as shown in FIG. 8

After this, the next task is to establish a mapping relationship between the projected intervals P1-P8 and their corresponding encoded bit vectors (EBV). From the lookup table shown in FIG. 6C, it can be seen that the first projected interval P1 corresponds to the primitive bit vector [1000 0100], which indicates that P1 overlaps with R(1) and R(6), where R(1) belongs to the first nonoverlapping rule group FD1_RG(1) with binary code [001], and R(6) belongs to the second nonoverlapping rule group FD1_RG(2) with binary code [01]. Therefore, we can combine [001] and [01] into a single bit vector [00101] and use this bit vector as the corresponding EBV of the first projected interval P1.

Similarly, for the second projected interval P2, its corresponding primitive bit vector is [0000 0100], which indicates that P2 overlaps with R(6), where R(6) is unassociated with the first nonoverlapping rule group FD1_RG(1) and therefore the binary code of R(6) associated with FD1_RG(1) is set to [000]. We can then combine [000] and [01] into a single bit vector [00001] and use this bit vector as the corresponding EBV of the second projected interval P2. The corresponding EBV of the other projected interval P3-P8 can be deduced in the same manner.

Based on the above nonoverlapping rule group encoding scheme, we can establish a PI-EBV lookup table module 110 and an EBV-FDRG lookup table module 120 shown in FIG. 8 based on the rule database 41 of FIG. 5

Projected-Interval Determining Module 210

The projected-interval determining module 210 is capable of reading the header of the input packet 60 for the value of each classification-related field specified by the rule database 41, and then use the value of each classification-related field as an index to find the corresponding projected interval (PI) and encoded bit vector (EBV) from the PI-EBV lookup table module 110.

For example, if the input packet 60 contains an FD1 value of [58], then the projected-interval determining module 210 will use the value [58] as an index to find from the PI-EBV lookup table module 110 shown in FIG. 8 that the corresponding projected interval is P3 whose EBV is [10001].

Nonoverlapping Rule Group Searching Module 220

The nonoverlapping rule group searching module 220 is capable of retrieving a number of probable rule sets from the EBV-FDRG lookup table module 120 by using the EBV values retrieved by the projected-interval determining module 210 from the PI-EBV lookup table module 110 as indexes.

The nonoverlapping rule group searching process is carried out by first segmenting each retrieved EBV into a number of indexes in reference to the associated rule groups, and then using these indexes to search the EBV-FDRG lookup table module 120 for corresponding rules (which are probable rules for the input packet 60).

For example, assume the input packet 60 contains an FD1 value of [58], then it can be seen from the PI-EBV lookup table module 110 shown in FIG. 8 that [58] corresponds to an EBV of [10001]. Since the EBV format of FD1 is the combination of a 3-bit code for FD1_RG(1) and a 2-bit code for FD1_RG(1), the EBV [10001] is decomposed into two parts: a 3-bit part [100] and a 2-bit part [01], where the first part [100] is used as an index for FD1_RG(1) while the second part [01] is used as an index for FD1_RG(2). Therefore, by using [100] and [01] as indexes to search the EBV-FDRG lookup table module 120, it can be found that [100] corresponds to the rule R(4), while [01] corresponds to the rule R(6). Next, these two retrieved rules R(4) and R(6) are combined as a probable rule set for FD1. The lookup process for retrieving a probable rule set for FD2 is carried out in the same manner.

In practice, for example, the above-mentioned probable rule set can be implemented in two different embodiments. The first embodiment is to use a code number collection, such as {4, 6}, where 4 represents R(4) and 6 represents R(6). The second embodiment is to use a bit vector of a length of N bits, where N equal to the number of the rules in the rule database 41. In this case, the probable rules R(4) and R(6) can be represented by a bit vector of [0001 0100]. In practice, the bit vector embodiment for the probable rule set is more preferable to use than the code number collection since it is more efficient in computation.

Intersection Operation Module 230

The intersection operation module 230 is capable of performing an intersection operation on all the probable rule sets retrieved by the nonoverlapping rule group searching module 220 to find a common rule that is included in all of the probable rule sets and output the matched rule as classification result 70 for the input packet 60.

For example, assume the bit vector of probable rule set for FD1 is [0001 0100], i.e., R(4) and R(6) are probable rules, and the bit vector of probable rule set for FD2 is [0001 0000], i.e., R(4) is a probable rule. In this case, the intersection operation module 230 is implemented with a logic-AND operation on [0001 0100] and [0001 0000], which results in a bit vector [0001 0000]. Since the resulted bit vector has a set bit, i.e., 1, at the (4)th position, it indicates that the (4)th rule R(4) in the rule database 41 is a matched rule for the input packet 60. As a result, R(4) is outputted as the classification result 70.

However, in the event that the intersection operation results in two or more matched rules, then the intersection operation module 230 will further perform a linear search process through these matched rules for one single rule that has the highest priority, and output this highest-priority rule as the classification result 70.

Operation of the Invention

The following is a detailed description of a practical application example of the computer network packet classification system of the invention 50 during actual operation. In this application example, it is assumed that the packet classification is based on 2 header fields [FD1, FD2] of each input packet 60 in accordance with a predefined rule database 41 having 8 rules shown in FIG. 5, and it is further assumed that the input packet 60 contains a header of [FD1, FD2]=[58, 117].

Figure 9:
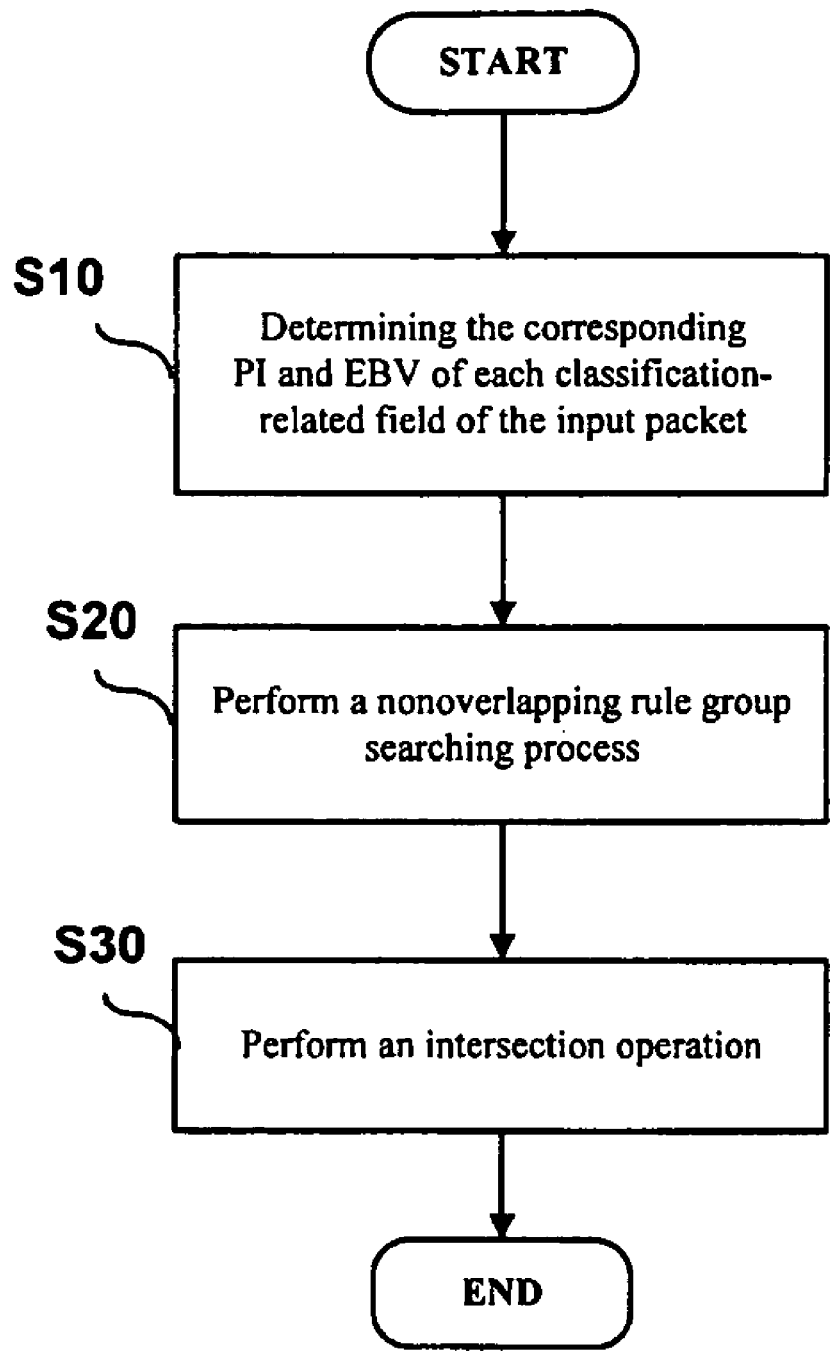
FIG. 9 is a flow diagram showing the procedural steps carried out by the invention for packet classification.

Referring to FIGS. 4, 8, and 9 together, in response to the reception of the input packet 60, the first step (S10) is to activate the projected-interval determining module 210 to read the header of the input packet 60 for the [FD1, FD2] values, i.e., [58, 117]. Using FD1=58 as an index, it can be retrieved from the PI-EBV lookup table module 110 that the corresponding projected interval is P3 whose EBV is [10001]; and using FD2=117 as an index, it can be retrieved from the PI-EBV lookup table module 110 that the corresponding projected interval is P5 whose EBV is [11011].

In the next step (S20), the nonoverlapping rule group searching module 220 is activated to decompose the FD1 EBV [10001] into two parts: [100] and [01], where the first part [100] is used as an index for FD1_RG(1) while the second part [01] is used as an index for FD1_RG(2). Therefore, by using [100] and [01] as indexes to search the EBV-FDRG lookup table module 120, it can be found that [100] corresponds to the rule R(4), while [01] corresponds to the rule R(6). Next, these two retrieved rules R(4) and R(6) are combined as a probable rule set for FD1, which is implemented with a bit vector of 8 bits, whose (4)th and (6)th bits are set to 1 respectively, i.e., [0001 0100].

In a similar manner, the FD2-mapped EBV [11011] is also decomposed into two parts: [11] and [011], where the first part [11] is associated with FD2_RG(1) while the second part [011] is associated with FD2_RG(2). Therefore, by using [11] and [011] as indexes to search the EBV-FDRG lookup table module 120, it can be found that [11] corresponds to the rule R(8), while [11] corresponds to the rule R(4). Next, these two retrieved rules R(4) and R(8) are combined as a probable rule set for FD2, which is implemented with a bit vector of 8 bits, whose (4)th and (8)th bits are set to 1 respectively, i.e., [0001 0001].

Subsequently, in the next step (S30), the intersection (logic and) operation module 230 is activated to perform an intersection (logic and) operation (which is implemented with a logic-AND operation) on the FD1-mapped bit vector [0001 0100] and the FD2-mapped bit vector [0001 0001], which results in a bit-vector [0001 0000]. Since the resulted bit vector contains a bit 1 at the (4)th position, and only one bit 1 is found in this bit vector, it is concluded that the corresponding rule R(4) is a matched rule for the input packet 60 and thus outputted as the classification result 70.

In conclusion, the invention provides a computer network packet classification method and system which is characterized by the use of a nonoverlapping rule group encoding scheme that allows the packet classification to be implemented with a reduced bit vector length, and thus a reduced memory space. This feature allows the packet classification to be carried out with enhanced system performance compared to prior art. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer network packet classification method for use on a network data processing unit for classification of an input packet in accordance with a predefined rule database, wherein the input packet contains a number of header fields, and the rule database specifies a number of rules corresponding to particular values of the header fields of the input packet;
the computer network packet classification method comprising:
building a projected-interval-to-encoded-bit-vector lookup table which predefines a mapping relationship of projected areas to encoded bit vectors, and which is constructed based on a nonoverlapping rule group encoding scheme which maps all the rules in the rule database onto a first one-dimensional Euclidean space and defines a number of projected intervals and a number of nonoverlapping rule groups over the first one-dimensional Euclidean space, and further define a number of encoded bit vectors corresponding to the projected intervals and the nonoverlapping rule groups;
building an encoded-bit-vector-to-nonoverlapping-rule-group lookup table, which predefines a mapping relationship of encoded bit vectors to nonoverlapping rule groups based on the nonoverlapping rule group encoding scheme;
during actual operation, reading the input packet for the value of each classification-related field, and then using each field value as an index to find corresponding projected interval and encoded bit vector from the projected-interval-to-encoded-bit-vector lookup table;
retrieving a number of probable rule sets from the encoded-bit-vector-to-nonoverlapping-rule-group lookup table by using a number of indexes obtained by segmenting each encoded bit vector into a number of parts corresponding to the nonoverlapping rule groups associated with each classification related field; and
performing an intersection operation on all probable rule sets to find a common rule included in all the probable rule sets as classification result.

2. The computer network packet classification method of claim 1, wherein the network data processing unit is a fire wall.

3. The computer network packet classification method of claim 1, wherein the network data processing unit is a router.

4. The computer network packet classification method of claim 1, wherein the network data processing unit is a network server.

5. The computer network packet classification method of claim 1, wherein the network data processing unit is a network workstation.

6. The computer network packet classification method of claim 1, wherein the probable rule set is implemented with a bit vector.

7. The computer network packet classification method of claim 1, wherein the probable rule set is implemented with a code number collection.

8. The computer network packet classification method of claim 1, wherein the intersection operation further performs a linear search process in an event that the intersection operation results in a number of possible rules, for finding among the multiple possible rules one single rule with highest priority as classification result.

9. The computer network packet classification method of claim 1, wherein the intersection operation is a logic-AND operation.

10. The computer network packet classification method of claim 1, wherein the input packet is an IPv4 (Internet Protocol Version 4) compliant packets.

11. The computer network packet classification method of claim 1, wherein the input packet is an IPv6 (Internet Protocol Version 6) compliant packets.

12. A computer network packet classification system for integration to a network data processing unit for classification of an input packet in accordance with a predefined rule database, wherein the input packet contains a number of header fields, and the rule database specifies a number of rules corresponding to particular values of the header fields of the input packet;
the computer network packet classification system comprising:
a projected-interval-to-encoded-bit-vector lookup table module, which predefines a mapping relationship of projected areas to encoded bit vectors, and which is constructed based on a nonoverlapping rule group encoding scheme which maps all the rules in the rule database onto a first one-dimensional Euclidean space and defines a number of projected intervals and a number of nonoverlapping rule groups over the first one-dimensional Euclidean space, and further define a number of encoded bit vectors corresponding to the projected intervals and the nonoverlapping rule groups;
an encoded-bit-vector-to-nonoverlapping-rule-group lookup table module, which predefines a mapping relationship of encoded bit vectors to nonoverlapping rule groups based on the nonoverlapping rule group encoding scheme;
a projected-interval determining module, which is reading the input packet for the value of each classification-related field, and then using each field value as an index to find corresponding projected interval and encoded bit vector from the projected-interval-to-encoded-bit-vector lookup table module;
a nonoverlapping rule group searching module, which is retrieving a number of probable rule sets from the encoded-bit-vector-to-nonoverlapping-rule-group lookup table module by using a number of indexes obtained by segmenting each encoded bit vector into a number of parts corresponding to the nonoverlapping rule groups associated with each classification related field; and
an intersection operation module, which is performing an intersection operation on all probable rule sets retrieved by the nonoverlapping rule group searching module to find a common rule included in all the probable rule sets as classification result.

13. The computer network packet classification system of claim 12, wherein the network data processing unit is a fire wall.

14. The computer network packet classification system of claim 12, wherein the network data processing unit is a router.

15. The computer network packet classification system of claim 12, wherein the network data processing unit is a network server.

16. The computer network packet classification system of claim 12, wherein the network data processing unit is a network workstation.

17. The computer network packet classification system of claim 12, wherein the probable rule set is implemented with a bit vector.

18. The computer network packet classification system of claim 12, wherein the probable rule set is implemented with a code number collection.

19. The computer network packet classification system of claim 12, wherein the intersection operation module further performs a linear search process in an event that the intersection operation results in a number of possible rules, for finding among the multiple possible rules one single rule with highest priority as classification result.

20. The computer network packet classification system of claim 12, wherein the intersection operation performed by the intersection operation module is a logic-AND operation.

21. The computer network packet classification system of claim 12, wherein the input packet is an IPv4 (Internet Protocol Version 4) compliant packets.

22. The computer network packet classification system of claim 12, wherein the input packet is an IPv6 (Internet Protocol Version 6) compliant packets.

* * * * *

UNITED STATES PATENT AND TRADEMARK OFFICE
CERTIFICATE OF CORRECTION

PATENT NO. : 7,792,120 B2  
APPLICATION NO. : 12/163048  
DATED : September 7, 2010  
INVENTOR(S) : Ching-Fu Kung et al.

It is certified that error appears in the above-identified patent and that said Letters Patent is hereby corrected as shown below:

Col. 6, lines 24-25; "[100]→ R(4), [110] → R(5), [110] → R(8), and then stored in the EBV-FDRG lookup table" should read -- [100]→ R(4), [101] → R(5), [110] → R(8), and then stored in the EBV-FDRG lookup table --

Signed and Sealed this  
First Day of March, 2011

David J. Kappos  
*Director of the United States Patent and Trademark Office*